April 14, 1959   H. A. LIEBHAFSKY   2,882,329
THERMOGALVANIC CELL
Filed April 9, 1957
Fig 1
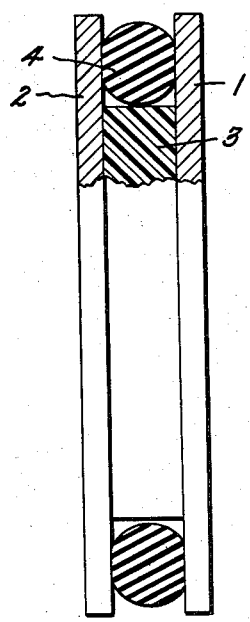
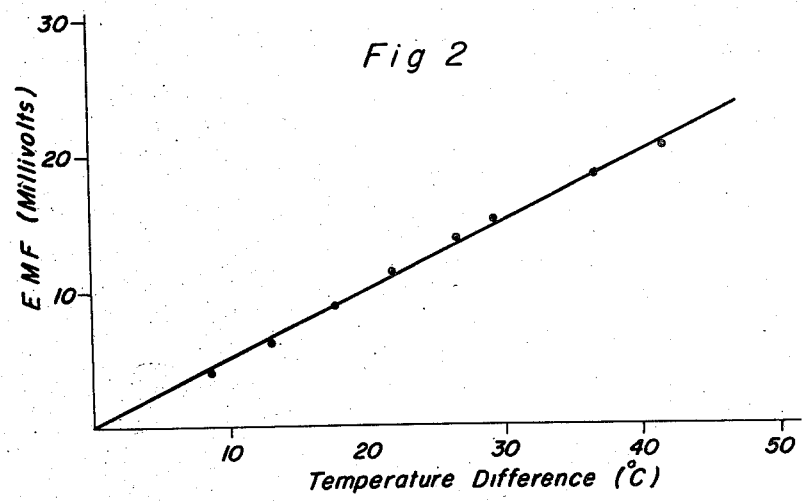
Fig 2
Inventor:
Herman A Liebhafsky,
by Paul A. Frank
His Attorney.

2,882,329
Patented Apr. 14, 1959

2,882,329
THERMOGALVANIC CELL

Herman A. Liebhafsky, Schenectady, N.Y., assignor to General Electric Company, a corporation of New York Application April 9, 1957, Serial No. 651,786

11 Claims. (Cl. 136—4)

This invention relates to thermogalvanic cells. More particularly, this invention relates to an improved thermogalvanic cell construction characterized by the absence of a liquid electrolyte.

A thermogalvanic cell is an electrolytic cell having two electrodes of the same composition which are separated by an electrolyte. A temperature differential existing between the interface of the first electrode and the electrolyte and the interface of the second electrode and the electrolyte generates a voltage in the cell.

Although thermogalvanic cells are known in the art, these prior art cells are characterized by the use of an aqueous electrolyte between the two electrodes. The presence of the aqueous electrolyte in these cells has led to design difficulties because of the problem of retaining the liquid electrolyte in the cell.

An object of the present invention is to provide an improved thermogalvanic cell.

A further object of the present invention is to provide a thermogalvanic cell which is essentially of a dry construction.

These and other objects of my invention are accomplished by providing a thermogalvanic cell having two metal electrodes with an electrolyte which comprises a cation permeable ion exchange resin membrane having the cation of the electrode metal as the mobile cation.

The features of my invention which I believe to be novel are set forth with particularity in the appended claims. My invention itself, both as to its structure and method of operation, together with further objects and advantages thereof, may be best understood by reference to the following description taken in connection with the accompanying drawing in which Fig. 1 is a diagrammatic illustration, partly in section, of a thermogalvanic cell of the present invention; and Fig. 2 is a plot of e.m.f. versus temperature differential for one of the cells of my invention.

The dry thermogalvanic cells of the present invention are based upon my discovery that an efficient, compact thermogalvanic cell is obtained if a particular type of cation permeable ion exchange resin membrane is sandwiched between two electrodes formed of similar metal. The ion permeable resin membrane serves as the sole electrolyte in the cell and therefore no aqueous electrolyte is required. The thermogalvanic cells of the present invention are best described by reference to Fig. 1. The cell comprises a first metal electrode 1, a second metal electrode 2, with an ion permeable resin membrane 3 sandwiched between electrodes 1 and 2. The electrodes 1 and 2 are each formed of the same material. If desired, a gasket 4 may be provided around the periphery of membrane 3 so as to seal the entire cell unit. The assembly is held together by any suitable means (not shown). For example, an insulated spring biased member may hold the electrodes in engagement with the membrane 3. Alternatively, the entire cell assembly may be encased in a suitable plastic material (not shown) which serves to protect the cells from mechanical wear while at the same time holding the cell elements in position. When the cell is encased in a plastic material, leads (not shown) extend through the housing to electrodes 1 and 2.

The cation exchange resins employed in the thermogalvanic cells of the present invention are well known polymeric materials which include in their polymeric structure dissociable ionizable radicals, the anion component of which is fixed into or retained by the polymeric matrix while the cation component is a mobile and replaceable ion electrostatically associated with the fixed component. The ability of the cation to be replaced under appropriate conditions by other cations imparts ion exchange characteristics to these materials. These ion exchange resins are employed in membrane form in the present invention. These membranes are sheets having a thickness much smaller than either of the other two dimensions. Ion exchange resin membranes are characterized by their insolubility in water and in both polar and non-polar organic solvents. This insolubility results from the cross-linked character of the synthetic polymeric material employed in the membrane structure.

As is well known, ion exchange resins are prepared by copolymerizing a mixture of ingredients, one of which contains an ionic substituent, or by reacting an ionic material with a resin polymerizate. In the case of cation exchange resins, the ionic substituents are acidic groups such as the sulfonic acid group, the carboxyl group, and the like. The ionizable group is attached to a polymeric material such as a phenol-aldehyde resin, a polystyrene-divinylbenzene copolymer, or the like. Thus, a typical cation exchange resin may be prepared by copolymerizing m-phenol sulfonic acid with formaldehyde. The preparation and properties of a number of different types of cation exchange resins is described throughout the literature and in particular in "Ion Exchange," F. C. Nachod, Academic Press, Incorporated, New York (1950); "Ion Exchange Resins," R. Kunin and R. J. Myers, John Wiley and Sons, Incorporated, New York (1950); and in U.S. patents such as 2,366,007, D'Alelio; 2,663,702, Kropa; 2,664,379, Hutchinson; 2,678,306, Ferris; 2,658,042, Johnson; 2,681,319, Bodamer; and 2,681,320, Bodamer.

The formation of these ion exchange resins into sheet or membrane form is also well known in the art and is described, for example, in "Amberplex Ion Permeable Membranes," Rohm and Haas Company, Philadelphia (1952), and in references mentioned in the aforementioned Rohm and Haas publication. In addition, the preparation of a number of different types of ion exchange resin membranes is described in Patent 2,636,851, Juda et al., and in Patent 2,702,272, Kasper. In general these ion exchange resin membranes are formed by one of two methods. In the first method the ion exchange resin is cast or molded into membrane or sheet form without the addition of other binding materials. In the second method the ion exchange resins are incorporated into binders which generally comprise thermoplastic resins such as polyethylene, polyvinyl chloride, methyl methacrylate, etc., and the ion exchange resin and binder are cast or molded into membrane form. It should be understood that the present invention is not limited to any particular type of ion exchange resin membrane. Any ion exchange resin membrane having mobile cations is satisfactory in the practice of the present invention.

As a general rule, ion exchange resins are prepared in aqueous solutions or suspensions of various types of organic compounds so that when the membrane is formed it is substantially saturated with water. Thus, a phenol sulfonic acid formaldehyde ion exchange resin is found to contain a plurality of reactive sites consisting of —SO$_3$H radicals attached to the resin matrix with sufficient water being held in the matrix so that the hydrogen ion is extremely mobile. In this form the resin is described as being substantially "solvated." By "solvated" it is meant that the resin contains enough of the solvation medium to substantially saturate the resin but not enough to make the resin wet. In the solvated state there is no tendency for the water to flow or drip from the resin.

From the foregoing description it is seen that the solvated ion exchange resin membranes employed in the practice of the present invention may be described as "dry" or as solid state membranes or electrolytes. The resins are dry since the water present in the resin is held to the resin by secondary Van der Waals forces.

As previously mentioned, the membranes employed as electrolytes in the present invention are substantially saturated solvated cation permeable ion exchange resin membranes in which the mobile cation is the cation of the electrode metal. As originally prepared or purchased, ion exchange resin membranes usually contain hydrogen as the mobile cation. The metallic cation is substituted for the hydrogen ion by soaking the hydrogen ion form of the membrane in a suitable solution of a salt of the desired cation. This process of substituting a metal ion for hydrogen in an ion exchange resin membrane is also well known in the art. Thus, the substitution of, for example, zinc ions for hydrogen ions can be accomplished by soaking the hydrogen ion form of the membrane in an aqueous solution of zinc sulfate for a period of from 1 to 4 hours, depending on the concentration of the aqueous zinc sulfate solution, to completely remove hydrogen ions from the membrane and substitute zinc ions therefor.

The cation exchange resin membranes of the present invention have previously been described as "solvated" with water as the solvation medium. It should be understood that other solvation mediums may also be employed. The only requirement of the solvation medium is that it be polar in nature so that the cation in the resin will remain in a mobile state. Where it is desired to employ a solvation medium other than water in the membranes, all or part of the water may be replaced with the new solvation medium by soaking the aqueous metal cation form of the resin in any suitable solvation medium. This has the effect of equilibrating the solvation medium originally in the resin with the bulk of the new solvation medium so as to substitute all or part of the new solvation medium for the water originally present in the resin. Where it is desired to replace all of the water in the resin with a new solvation medium, this may be accomplished by soaking the water solvated membrane in a large excess of the new solvation medium until an equilibrium is established. The membrane is then removed from the solvation medium, wiped dry, and the process is repeated several times. Alternatively, the water in a resin may be removed by subjecting the resin to high vacuum at elevated or room temperatures. After being made bone dry the resin may be resolvated by soaking it in the new solvation medium until substantial saturation has been obtained. In addition to water, polar liquids such as dimethyl formamide, alcohols, e.g., ethylene glycol, ethyl alcohol, n-propyl alcohol, n-butyl alcohol, the monomethyl ether of ethylene glycol, etc., may be employed as the solvation medium. The solvating liquid can also comprise mixtures of more than one of the solvating materials. Thus, mixtures of water with any of the aforementioned solvating liquids may be employed. When a mixture of water and another polar liquid is employed as a solvating medium, I prefer to employ about 10 percent by volume of water and 90 percent by volume of the second liquid. When the solvating medium desired as a replacement for water in a water solvated membrane has a boiling point higher than the boiling point of water, it is also possible to substitute the new solvation medium with water by subjecting the membrane to a high vacuum in the presence of the desired solvation medium.

The electrodes employed in cells of the present invention may be formed of a wide variety of metals. The only limitation upon the metal is that it not react with the electrolyte except when a thermal gradient and external electrical connections are provided between the two electrodes. Suitable metals for use as electrodes includes silver, zinc, cadmium, tin, nickel, lead, iron, cobalt, or copper, with copper being the preferred electrode material.

The gasket 4 surrounding electrolyte 3 in the drawing may be formed of any material which is not affected by the electrolyte. Preferably, the gasket is formed of a resilient material, such as natural or synthetic rubber.

As previously mentioned, the cells of the present invention respond to a temperature differential between the interface of the first electrode and the electrolyte and the interface of the second electrode and the electrolyte. Because the temperatures of these interfaces are essentially the same as the temperatures of the respective electrodes, the operating temperature differential will hereinafter be referred to as the temperature differential between the electrodes. In the operation of the cells of this invention the temperature differential between the electrodes establishes a galvanic potential between the electrodes. In general, the characteristics of the cells of the present invention are seuch that a linear relationship exists between the temperature differential and the voltage difference. It has been found that the colder of the two electrodes serves as the anode in the cell with the warmer electrode serving as the cathode. At the anode the metal of the anode goes into solution in the electrolyte, yielding free electrons. At the cathode, free electrons react with the metal cations in the electrolyte to deposit metal on the cathode. Thus, the effect of the overall cell reaction is to dissolve metal from the anode and deposit it on the cathode. Because of the fact that the electrolyte of the present invention begins to decompose at a temperature of about 100 C., the thermogalvanic cells of this invention are designed to operate with a maximum electrode temperature of less than 100° C. In general, a desirable operating range for the cells of the present invention is from about 0° C. to 80° C.

The size and shape of the elements comprising the cell of the present invention may vary within extremely wide limits. However, for most applications it is desirable to provide electrodes and electrolyte in as thin a form as possible. In the ideal case, electrodes 1 and 2 are formed of metal foils which vary in thickness from about a half mil to 5 mils. The electrolyte membrane is cut from sheet material having a thickness of from about 3 mils to 75 mils. No disadvantage or noticeable effect on the cell is obtained by using heavy metal plates as electrodes. However, no advantage is gained thereby. In practice it is desirable to use relatively thin ion exchange resin membrane electrolytes, since increasing the thickness of the electrolyte increases the internal resistance of the cell. The shape of the electrodes and electrolyte are generally circular or square. However, other geometries may be employed. The total area of contact between the electrolyte and the electrodes is immaterial, except that the overall capacity of the cell increases as this area increases.

The following examples are illustrative of the practice of my invention.

The ion exchange resin membrane electrolyte employed in the examples was one of two types. The first membrane will be referred to in the examples as a "polyethylene membrane." These polyethylene membranes are available as Amberplex C–1 cation exchange membranes (Rohm and Haas Company) and are prepared by first polymerizing a mixture of about 95 parts by weight of styrene and about 5 parts by weight of divinyl benzene. The resulting polymer is comminuted to fine particles and 100 parts by weight of this finely divided material is sulfonated by reaction with about 175 parts by weight of chlorosulfonic acid. This reaction is carried out by heating the mixture at its reflux temperature for about 3 minutes and then maintaining the mixture at room temperature for an additional 50 hours. The sulfonated product is then treated with a large excess of water to destroy the excess of chlorosulfonic acid and any acid chlorides which are formed. This results in a sulfonated resin containing 3.1 milliequivalents of mobile hydrogen ions per gram of resin. After drying this sulfonted resin, 2 parts by weight of the dried resin are mixed with 1 part by weight of polyethylene and the resulting mixture is pressed into sheet or membrane form. The resulting polyethylene membrane contains 2.1 milliequivalents of mobile hydrogen ions per gram of dry membrane. When the dried membrane is soaked in water the resulting water solvated product contains about 45 percent by weight of water.

The second type of membrane is referred to in the examples as a "phenolic" membrane. The preparation of this membrane is described in Example 9 of Patent No. 2,636,851, Juda et al. These membranes are homogeneous phenol sulfonic acid formaldehyde resin membranes prepared by molding the resin at 50° C. into membrane form. After soaking this membrane in water it was found to contain 54 percent by weight of water based on the wet weight of the membrane, a capacity of 2.2 milliequivalents per dry gram of membrane and a resistivity in the solvated form of 9.6 ohm centimeters at 25° C.

*Example 1*

The polyethylene membrane described above was soaked in a 16 percent aqueous copper sulfate solution for 4 hours to yield a water solvated membrane having copper ions as its mobile ion. This membrane had a thickness of 25 mils and a square of this resin was cut having an area of 1.5 square inches. This membrane was sandwiched between two square copper electrodes having a surface area of 4 square inches and a thickness of ½ inch. One of the copper electrodes was maintained at a temperature of about 0° C. while the other of the electrodes was heated to different temperatures. The temperature difference and the electromotive force between the two electrodes is plotted in Fig. 2. As is shown from Fig. 2 the voltage between the two electrodes varies linearly with temperature differential and is equal to 0.50 millivolt per degree centigrade. The cell of this example represents the preferred embodiment of my invention.

*Example 2*

The procedure of Example 1 was repeated except that silver foil having a thickness of 1 mil was used for each of the electrodes. Measurement of the temperature differential and voltage between the two electrodes showed that the voltage varied linearly with temperature difference and was equal to 0.6 millivolt per degree centigrade. In this example the resin membrane was converted to its silver form by soaking the membrane in 15 percent aqueous silver nitrate for 4 hours until silver ions had replaced the hydrogen ions in the membrane. The resin was then washed several times with water to remove all traces of silver nitrate.

*Example 3*

The phenolic resin referred to previously was converted to its copper ion form by soaking the membrane in a 16 percent aqueous copper sulfate solution for 4 hours. This resulted in a membrane which was substantially saturated with water and which contained copper ions as the mobile ion. A square of this membrane 30 mils thick and having an area of about 1.5 square inches was sandwiched between the copper electrodes described in Example 1. Measurements of voltage difference and temperature difference between the two electrodes showed that the E.M.F. of this cell varied linearly with temperature differential and equalled about 0.6 millivolt per degree centigrade.

*Example 4*

The phenolic membrane with mobile copper ions described in Example 4 was soaked in a large volume of a solution of 10 percent water in 90 percent ethylene glycol for 12 hours. At the end of this time the resin was substantially saturated with the water-ethylene glycol mixture. A portion of this membrane having a thickness of 30 mils and a diameter of ⅜ inch was pressed between two copper electrodes having a diameter of ⅜ inch. Measurement of the potential difference between the two copper electrodes at various temperature differentials showed that the voltage difference varied directly with the temperature difference and had a value of about 0.5-0.7 millivolt per degree centigrade.

*Example 5*

The hydrogen ion form of the phenolic resin previously described was soaked in a 16 percent aqueous solution of zinc sulfate for 4 hours to replace the mobile hydrogen ions of the membrane with mobile zinc ions. Subsequently the zinc form of the membrane was washed several times with water to remove all traces of zinc sulfate. Employing the geometry of Example 1 except that zinc electrodes were substituted for the copper electrodes of Example 1, this cell was found to produce about 15 millivolts at a temperature difference between the electrodes of about 30° C.

The cells of the present invention are useful in many different types of applications where a temperature differential can be translated into an electrical potential.

One particularly useful application of the cells of this invention is in the control of air conditioning apparatus. In many localities it is desirable to maintain the temperature of air conditioned areas a fixed number of degrees below the outside temperature, rather than maintaining the air conditioned area at a particular temperature. In such air conditioning installations, the cells of the present invention can be used to detect the temperature differential between the air conditioned area and the outside air. This may be done, for example, by placing one of the cells of the present invention in a suitable container which provides access of outside air to one electrode of the cell while inside air has access to the other electrode of the cell. Since the potential difference between the two electrodes is proportional to the temperature difference between the two electrodes, any suitable means responsive to a preselected voltage difference between the two electrodes may be used to start or stop the air conditioning apparatus in the area, thus maintaining a fixed temperature differential between the air conditioned area and the outside air.

Another use for the thermogalvanic cells of this invention is in the measurement of temperatures. Thus, if one electrode of the cell is maintained at a fixed temperature, for example, by immersion in a water-ice bath, and the other electrode is brought into contact with the object whose temperature is to be measured, the potential generated by the thermogalvanic cell can be converted into a temperature reading and thus the temperature of the unknown may be read directly from a plot of voltage versus temperature.

What I claim as new and desire to secure by Letters Patent of the United States is:

1. A thermogalvanic cell comprising a first metal electrode, a second metal electrode formed of the same metal as said first electrode, and a cation permeable ion exchange resin membrane electrolyte as the sole electrolyte in direct contact with each of the aforesaid metal electrodes and having as its mobile cation the cation of the electrode metal.

2. A thermogalvanic cell comprising a first metal electrode, a second metal electrode formed of the same metal as said first electrode, and a substantially solvated cation permeable ion exchange resin membrane electrolyte as the sole electrolyte in direct contact with each of the aforesaid metal electrodes and having as its mobile cation a cation of the electrode metal.

3. The cell of claim 2 in which the electrolyte is solvated with water.

4. A thermogalvanic cell comprising a cation permeable ion exchange resin membrane electrolyte sandwiched between two copper electrodes, said electrolyte having copper ions as its mobile cation.

5. A thermogalvanic cell comprising a cation permeable ion exchange resin membrane electrolyte sandwiched between two silver electrodes, said membrane electrolyte having silver ions as its mobile cation.

6. A thermogalvanic cell comprising a first metal electrode, a second metal electrode formed of the same metal as said first electrode, a cation permeable ion exchange resin membrane electrolyte having as its mobile cation the cation of the electrode metal, and a resilient gasket surrounding the periphery of said electrolyte and sandwiched between said first metal electrode and said second metal electrode.

7. A thermogalvanic cell comprising a cation permeable ion exchange resin membrane electrolyte having copper ions as its mobile cation sandwiched between a pair of copper electrodes and a resilient gasket surrounding the electrolyte and also sandwiched between said pair of electrodes.

8. A thermogalvanic cell comprising a first metal electrode, a second metal electrode formed of the same metal as said first electrode, and a cation permeable ion exchange resin membrane electrolyte as the sole electrolyte in direct contact with the aforesaid metal electrodes, said electrolyte being substantially saturated with a polar liquid and having as its mobile cation the cation of the electrode metal.

9. The thermogalvanic cell of claim 8 in which the polar liquid comprises a mixture of water and ethylene glycol.

10. A thermogalvanic cell comprising a cation permeable ion exchange resin membrane electrolyte sandwiched between and in direct contact with and being a pair of copper electrodes, said membrane electrolyte being the sole electrolyte substantially saturated with a polar liquid and having copper ions as its mobile cation.

11. A thermogalvanic cell comprising a cation permeable ion exchange resin membrane electrolyte sandwiched between two zinc electrodes, said electrolyte having zinc ions as its mobile cation.

References Cited in the file of this patent

UNITED STATES PATENTS

| | | |
|---|---|---|
| 1,920,151 | Ruben | July 25, 1933 |
| 2,622,116 | Maize | Dec. 16, 1952 |
| 2,786,088 | Robinson | Mar. 19, 1957 |

OTHER REFERENCES

Zeitschrift für physikalische Chemie, vol. 181, pages 169–182 (1937).